(12) United States Patent
Baba et al.

(10) Patent No.: US 9,998,542 B2
(45) Date of Patent: Jun. 12, 2018

(54) SYSTEM AND METHOD FOR DETERMINING ROUTING INFORMATION

(71) Applicant: YOKOGAWA ELECTRIC CORPORATION, Musashino-shi, Tokyo (JP)

(72) Inventors: Shunsuke Baba, Musashino (JP); Kazuya Suzuki, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 258 days.

(21) Appl. No.: 14/878,721

(22) Filed: Oct. 8, 2015

(65) Prior Publication Data
US 2016/0182303 A1    Jun. 23, 2016

(30) Foreign Application Priority Data

Dec. 18, 2014    (IN) .......................... 6360/CHE/2014

(51) Int. Cl.
*H04L 29/08* (2006.01)
*H04L 12/26* (2006.01)
*H04L 29/06* (2006.01)

(52) U.S. Cl.
CPC ............ *H04L 67/12* (2013.01); *H04L 43/106* (2013.01); *H04L 63/12* (2013.01)

(58) Field of Classification Search
CPC . H04L 45/245; H04L 45/7453; H04L 47/125; H04L 61/103
See application file for complete search history.

(56) References Cited

U.S. PATENT DOCUMENTS

| 8,976,647 | B2* | 3/2015 | Song | H04L 47/125 370/229 |
| 9,130,845 | B2* | 9/2015 | Lee | H04L 43/028 |
| 9,600,443 | B2* | 3/2017 | Albano | G06K 9/00369 |
| 2009/0046734 | A1* | 2/2009 | Cheriton | H04L 12/4608 370/412 |
| 2012/0078915 | A1* | 3/2012 | Darcy | G06F 17/30097 707/747 |
| 2013/0197859 | A1* | 8/2013 | Albano | G06K 9/00369 702/150 |

* cited by examiner

*Primary Examiner* — Steven H Nguyen
*Assistant Examiner* — Emmanuel Maglo
(74) *Attorney, Agent, or Firm* — Westerman, Hattori, Daniels & Adrian, LLP

(57) ABSTRACT

The disclosure relates to a method for determining routing path of a packet in a communication network. The method includes steps, but is not limited to, (i) receiving, by a data collection module, a packet from each of at least two sensors (ii) generating, by a digest information generator, a footprint for each packet received from each of the at least two sensors (iii) comparing, by an analysis module, whether each of the at least one footprint generated matches a last generated footprint.

7 Claims, 10 Drawing Sheets

SYSTEM AND METHOD FOR DETERMINING ROUTING INFORMATION

FIELD OF THE INVENTION

The disclosure is directed generally toward communication networks. In particular, the present invention is directed to methods for determining routing information.

BACKGROUND

Communication networks are ubiquitous in modern process control systems used in oil and gas refineries. The communications networks can be designed to provide a duplex communication between equipment and a distributed control system (DCS). The distributed control system acts as a central command centre for controlling equipment and various sub systems in a refinery or a manufacturing plant. The DCS includes a human machine interface (HMI) for a control room operator to initiate and control operations of a process control system by sending and receiving control commands. The control commands are sent to the controllers connected by communication networks such as Ethernet or wireless networks. In the same way, the controllers respond with information about the equipment that is controlled. This information is used to monitor process controlled by the process control system.

In communication networks, routing includes selecting a shortest or a cost efficient path in a communication network for data transmission. Routing involves using general network devices such as routers, switches, bridges, firewalls and gateways. Primarily, routers are devices used to forward packets between two different communication networks. However, within a communication network, devices such as switches, firewalls, gateways and personal computers transmit and receive packets.

In packet switched networks, established networking protocols such as Internet Protocol (IP) are used. These protocols are dynamic and are designed to allow continued functioning of network even when failures in some network hardware occur in a communication network, thereby making the networks resilient. In other words, the protocols respond to changes such as network capacity, utilization, cost and availability to adjust the path a packet travels in a network. A routing path is a path, which the packet has taken to reach a destination from a source, used for analysing communication patterns. Network security applications use routing path of packets for analysing patterns in packet behaviour.

In process plants, different parts of its network are separated by network security devices such as firewalls and an access control list permits or denies access to portions of the network based on permissions available to specific personnel or vendors. In the absence of access rights to all parts of a network, the source of the packet cannot be verified. Also, if a computer in the network is infected with a virus or a malware, packets may be a result of spoofing to include a false source IP address. In these cases, routing information, mainly source of the packet, is not available. The only source IP address available is the source IP address present in the packet itself. By extension, the routing path of the packet is not evident from the source IP address present as the source IP address is replaced when the packet hops from one network device such as router to another. Therefore, it becomes necessary to identify the entire routing path to trace the source of the packet to prevent or identify security breaches in a network.

Existing methods of routing path estimation such as the one shown in FIG. 3 have estimation of routing path performed on computers connected to a databus. However, such methods may not be effective due to the absence of processing the packets prior to analysis that estimates routing path.

Furthermore, a packet passes through multiple routers and duplicate information about the same packet may be received at multiple routers as the packet passes through them. It is imperative to resolve the duplication of the same packet across different routers to identify the path of the packet.

SUMMARY

In one aspect of the present invention, a packet transmission system may include, but is not limited to one or more processors; a data collection module; a digest information generator; and an analysis module. The data collection module may be configured to acquire packets received by a first sensor and a second sensor. The digest information generator may be configured to generate a first footprint for the packet acquired by the data collection module from the first sensor and a second footprint for the packet acquired by the data collection module from the second sensor. The analysis module may be configured to determine whether the second footprint matches the first footprint. The data collection module, the digest information generator module and the analysis module are implemented by the one or more processors.

In some embodiments, a system for estimating a routing path may include, but is not limited to, a list of routers that a packet passed through in a communication network. The system may also include, but is not limited to, a processor, a data collection module, a digest generator module and an analyser module. The data collection module may be configured to acquire a packet from each of at least two sensors. The digest information generator may be configured to generate a footprint for each packet acquired by the data collection module from each of the at least two sensors. The analysis module may be configured to compare whether each of the at least one footprint generated matches a last generated footprint, wherein the data collection module, the digest information generator module and the analysis module are implemented by the one or more processors.

According to an embodiment of the invention, the data collection module may be configured to acquire packets from at least two sensors. The at least two sensors are each connected to one common router. The routers are part of the communication network. According to some embodiments of the present invention, routers play important roles in communication between two different networks. Each network includes interconnections with different networks.

In an embodiment, the digest information generator may be configured to generate a footprint to include at least one footprint. The generation of footprint includes calculation of at least one hash value. The hash value is in turn generated using at least one hash function.

In another embodiment of the present invention, the footprint may include, but is not limited to, a time stamp of the packet. This time stamp may be generated at the data collection module at the time the packet was received.

In some embodiments of the present invention, a number of the hash values present in the footprint may be determined using the size of the packet and the maximum transmission unit size specified by a protocol.

In an embodiment, the analysis module may be configured to perform comparison operations to send the footprint to data bus when the same footprint is not found in the last generated footprint and to send the footprint to at least one memory slot when the same footprint is found in the last generated footprint.

In another embodiment, a routing path of the packet can be estimated using the time stamp sequence of the packet when it is found that the footprint generated for the packet matches the last generated footprint.

According to some embodiments, a method for routing path estimation of a packet passing through a communication network may include, but is not limited to, (i) receiving, by a data collection module, a packet from each of at least two sensors; (ii) generating, by a digest information generator, a footprint for each packet received from each of the at least two sensors; and (iii) comparing, by an analysis module, whether each of the at least one footprint generated matches a last generated footprint.

In an embodiment of the present invention, each of the at least two sensors may be connected to corresponding one of at least two routers. The footprint also includes a hash value that is generated using a hash function. The footprint may include a time stamp of the packet, in some embodiments of the present invention.

In some embodiments of the present invention, the number of hash values present in the footprint is determined using the size of the packet and the maximum transmission unit size specified by a protocol.

In another embodiment of the present invention, the method may further include, but is not limited to, performing a comparison during which the footprint is sent either to data bus when the same footprint is not found in the last generated footprint or to at least one memory slot when the same footprint is found in the last generated footprint.

In some embodiments of the present invention, the method may further include, but is not limited to, determining a routing path for the packet using time stamp sequence of the packet when the footprint generated matches a last generated footprint.

In some embodiments of the present invention, a non-transitory computer readable medium stores a computer program to be executed by a computer to perform a method for estimating a routing path of a packet in a communication network. The method may include, but is not limited to, acquiring, by a data collection module, packets received by a first sensor and a second sensor; generating, by a digest information generator, a first footprint for the packet acquired by the data collection module from the first sensor and a second footprint for the packet acquired by the data collection module from the second sensor; and determining, by an analysis module, whether the second footprint matches the first footprint.

BRIEF DESCRIPTION OF THE ACCOMPANYING DRAWINGS

DETAILED DESCRIPTION

Figure 1:
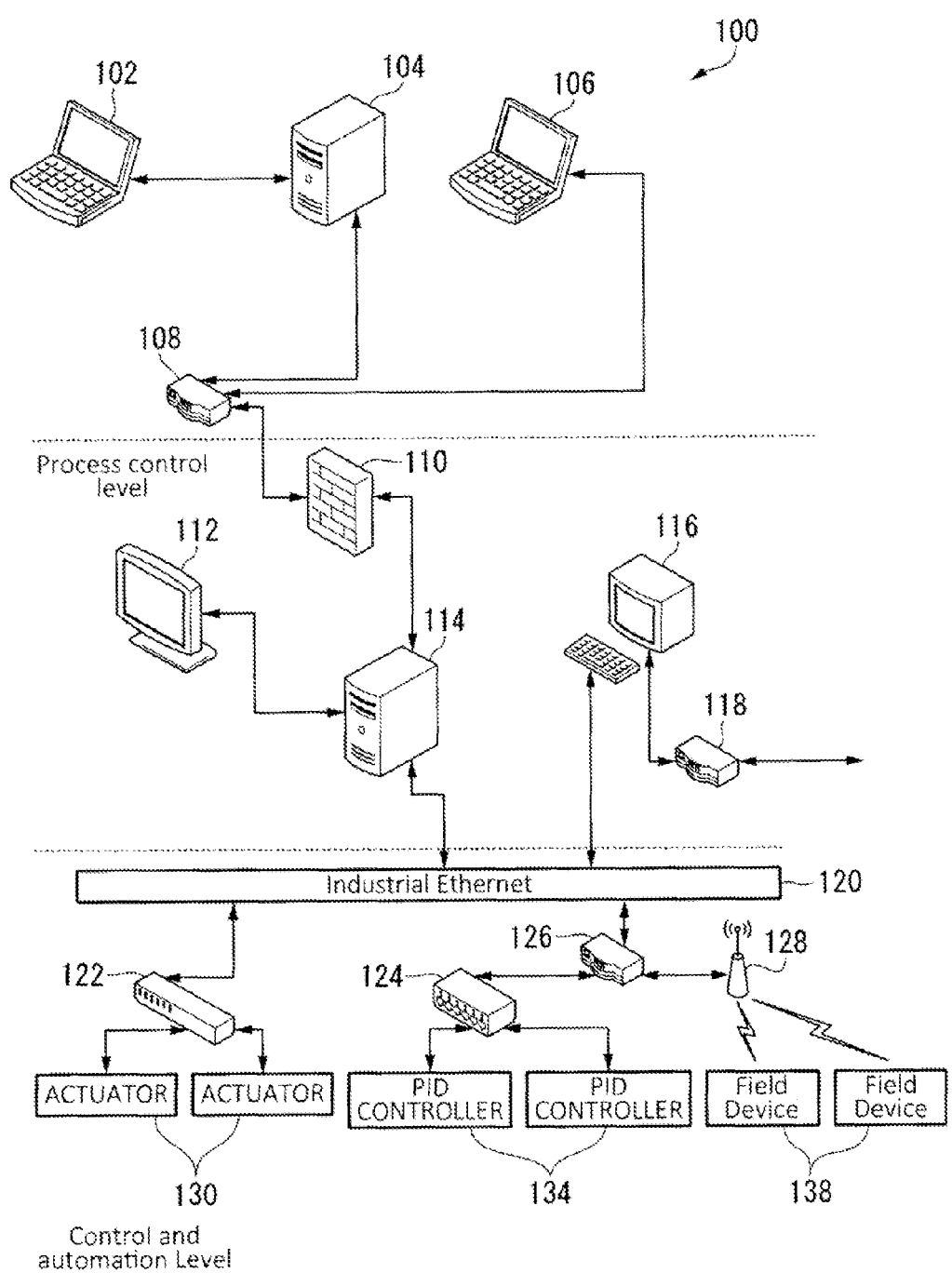
FIG. 1 is a diagram of an example of an environment where some embodiments of the present invention reside.

For the purpose of describing the present invention, certain terms are defined below. Except where expressly defined, terms within the specification and claims shall be understood to have the meaning that is apparent to one of ordinary skill in the art.

"Communication network" refers to a collection of networked computing devices connected via a communication infrastructure such as cable media or wireless media. Examples of communication network include, but are not limited to, local area network (LAN) and wide area network (WAN).

"Routing" refers to a process of selecting a path among multiple paths available among networked computing devices in a communication network.

"Packet switched network" refers to a communication network capable of carrying all digital communications regardless of content type, size or structure in the form of discrete fixed sized blocks called packets. Some examples of packet switched network include, but are not limited to, the Internet and the local area network (LAN). An example of a packet switched network is an Internet Protocol (IP) based network wherein each packet is created and transmitted by network devices in accordance with specification prescribed in a standard RFC 791. The IP packet contains a header section and a payload section. The header includes information, but is not limited to, source IP address, destination IP address, a timestamp, and various parameters. The payload section includes data transmitted by the packet.

"Industrial control network" refers to a communication network that comprises interconnected equipment that is used to monitor and control physical equipment or devices in an industrial environment such as process control in oil refinery. The industrial control network differs from conventional communication networks by specific requirements related to high reliability, failure severity, packet round trip time, and data packet size. For example, packet round trip time in industrial control networks ranges from 250 micro seconds to 10 milliseconds. This is comparably smaller than 50 milliseconds of packet round trip time used in conventional networks. Data packet size in industrial control networks is smaller than conventional networks. Consider the example of transmitting a single measurement; it is usually in the order of few bytes along with overhead information in comparison to conventional networks that have packet sizes starting with 64 bytes.

"Industrial Ethernet" refers to a communication network that uses Ethernet standards for wiring and signalling, but with use of rugged connectors that can withstand higher temperatures, vibration, electrical noise and other operating conditions of process plants or manufacturing facilities. The operating conditions present in industries such as manufacturing or process plants involves equipment placed near higher temperatures in the order of hundreds of degree Celsius, moisture, dust and vibration. This is in contrast to conventional networks working in clean and temperature controlled environments such as air conditioned areas with 18 to 27 degrees Celsius.

"Hub" or a network hub refers to a networking device that allows connecting multiple Ethernet devices together to form a network segment by allowing connections at physical layer or layer 1 of an OSI (Open Systems Interconnection) model.

"Switch" or a network switch refers to a networking device that performs the function of packet switching by allowing connections at data link layer or layer 2 of the OSI model. The switch can manage the flow of packets by transmitting a packet to the intended network device. The switch is considered an intelligent hub because of its ability to direct packets to specific devices unlike the hub that transmits packets to all connected devices. Thus switches have higher data transmission rate than hub by addressing packets to specific devices attached.

"Router" refers to a specialized networking hardware that performs the function of forwarding packets between communication networks. A routing table is configured in a router to direct packets to the subsequent network. A router works at the layer 3 or the network layer of the OSI model.

"Datagram" refers to the basic unit of transmission, a self-contained, independent entity of data carrying sufficient information to be routed from the source to the destination computer without reliance on earlier exchanges between this source and destination computer and the transporting network.

"Internet Protocol" (IP) refers to a key communications protocol for an Internet Protocol suite for relaying datagrams across different communication networks. Because this protocol is important to the routing function based on Internet Protocol addresses, it forms the basis of Internet addressing and networking.

"Firewall" refers to a network security device that controls incoming and outgoing traffic of packets based on a preconfigured set of rules. It is primarily used between a secure network and another network that is considered external or unsecure, for example, the Internet. In this context, firewall is additionally used to segregate different portions of an enterprise or an industrial plant network.

"Sever" refers to any system that responds to a request across a communication network. An example of a server in process control is an OPC (Object Linking and Embedding for Process Control) that receives requests from a client in an industrial control network complies with OPC standards. The server responds to the client with an appropriate response message in accordance with a standard such as the OPC standard.

"Hash function" refers to a function that can map any data or a data packet to a fixed size data. The result of passing any data or a data packet to a hash function is called a hash value or simply hash. For example, Secure Hash Algorithm (SHA) and Message Digest algorithm (MD-5) are hash functions. A packet may be modified to remove variables in order to calculate the hash of the fixed data contained in the packet.

"Footprint" refers to any data structure that includes information derived from a packet and can be used to uniquely identify the packet. A footprint typically includes a hash value and selected fields present in a packet header.

"Databus" refers to a part of a communication network that can distribute data to multiple computers at the same time. Typically, the data sent though databus is footprint derived from original data in a new format, wherein the footprint includes fields containing information that is a subset of the original data or data packets. For example, a client computer may be attached to a databus for performing analysis of footprint.

FIG. 1 is a diagram of an example of an environment 100 where some embodiments of the present invention reside. As shown in FIG. 1, the environment 100 includes, but is not limited to, three levels of network.

The first level is a control and automation level. The first level includes actuators 130, PID controllers 134, and field devices 138. The actuators 130 are connected to a hub 122 via an industrial control network. Some examples of the industrial control network use protocols, not limited to, Foundation Fieldbus, Modbus, and Profibus. The hub 122 is used in this example wherein the control elements, the actuators 130, are part of the same network segment. Similarly, the PID controllers 134 are connected to a switch 124 by the industrial control network. The switch 124 is used, in an example for connecting many measurement and control equipment such as PID controllers 134, and field devices 138 together. The switch 124 is more advanced than the hub 122 because it sends a packet only to the device that requests for the packet, rather than broadcasting the packet to all the connected devices. The field devices 138 are connected to a wireless access point 128 by a wireless network. An example of wireless network may include, but is not limited to, wireless local area network (WLAN) implementing IEEE 802.11a, 802.11b, and 802.11b specifications in the 2.4 or 5 GHz frequency bands. The field devices 138 are connected wirelessly to the wireless access point 128 and this eliminates the need for physical connection using cables thereby reducing cost of installation and maintenance. The wireless access point 128 and the switch 124 are connected to a router 126. The industrial control automation network including the hub 122 and the router 126 are in turn connected to an Industrial Ethernet 120.

In FIG. 1, the network elements shown below the Industrial Ethernet 120 form the control and automation level. It will be understood that by those skilled in art that the any one of the control elements presented in FIG. 1 are connected to the router 126, or the hub 122 or the wireless access point 128 depending on requirements of the process plant. Furthermore, the hub 122 or the switch 124 can either be connected to the router 126 directly via the Industrial Ethernet 120. FIG. 1 is intended to show by the way of an example, an environment in the process plant where embodiments of the present invention resides and the scope of the present invention should not be construed to be limited to the example presented herein.

The second level in the example environment of the invention shown in FIG. 1 is a process control level. This includes a local control station 112, a server 114 and an operator control station 116. In the second level, the communication network used is the Industrial Ethernet 120. The local control station 112 and the operator control station 116 are connected to the server 114 in the same network. The operator control station 116 is also connected to a router 118. The router 118 is connected to another process control system in the same plant which has a plurality of process control systems according to some embodiments of the invention.

The third level in the environment shown in FIG. 1 is a central computer management level. The server 114 as described above is connected to a firewall 110. The firewall 110 is configured to allow the central computer management level to communicate with the second level and first level. The firewall also prevents any unauthorized traffic flowing from the central computer management level to the second level and first level. The central computer management level includes a server 104 and two terminals 102 and 106 that communicate using a communication network such as industrial Ethernet.

In some embodiments of the present invention, the local control station 112, the operator control station 116, and the server 114 are connected to a router 108. The router 108 is connected to the server 114 in process control level through a firewall 110. The three routers 108, 118, and 126 shown in FIG. 1 are used for collecting communication network packets for analysis and thereby estimating the routing path of the packets flowing through the communication network.

In another embodiment of the present invention, the routers 108, 118, and 126 are connected to a computer 140 (not shown) including the system components used to estimate the routing path of the packets flowing through a communication network, as shown in the environment 100 of FIG. 1.

It would be understood that the communication network shown in the second and third levels of the environment 100 in FIG. 1 is a packet switched network that embody network protocols including, but is not limited to, Transmission Control Protocol (TCP), IP, X.25 and Frame Relay transmitted via the industrial Ethernet. In the environment as shown in FIG. 1, the communication network used in first level is industrial control network. Examples of the industrial control network use protocols, not limited to, Foundation Fieldbus, Modbus, and Profibus. The communication network used in the second and third levels is the industrial Ethernet. It uses protocols based on OSI models such as Transmission Control Protocol (TCP) and IP.

A converter not shown is used to convert traffic from the industrial control network using protocols such as Foundation Fieldbus, Modbus, and Profibus to Internet Protocol, in accordance with some embodiments of the present invention.

Figure 2:
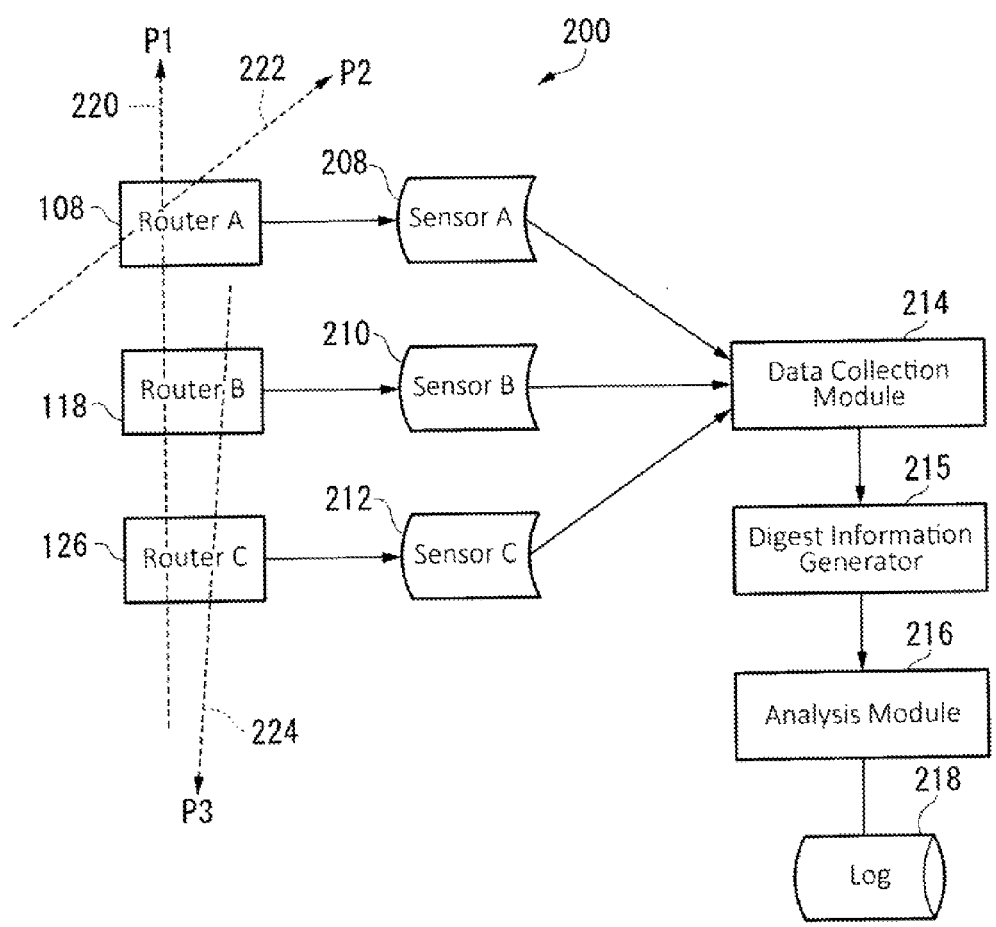
FIG. 2 is a diagram of an exemplary packet flow in a part of a communication network, according to some embodiments of the present invention.
Figure 3:
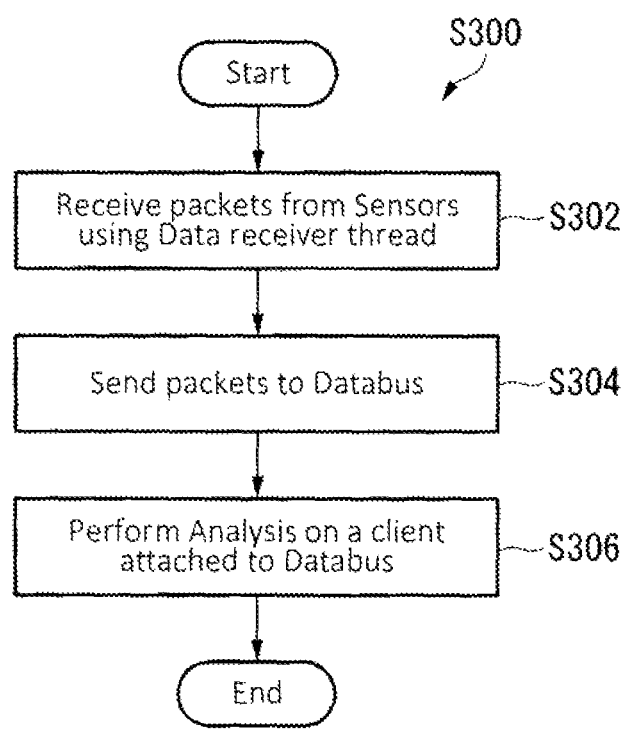
FIG. 3 is a flow chart of processing in routing path estimation in related art.

FIG. 2 is a diagram 200 of an exemplary packet flow in a part of a communication network, according to some embodiments of the present invention. Router A 108, router B 118, and router C 126 are the same as the three routers shown in FIG. 1. Sensor A 208, sensor B 210 and sensor C 212 are connected to the three routers A 108, B 118 and C 126 respectively. The sensors A 208, B 210, C 212 receive a copy of the packet A 202, packet B 204, packet C 206 (not shown) passing through the routers A 108, B 118, C 126 connected to a communication network. The dotted lines P1 220, P2 222, and P3 224 represent three exemplary paths taken by three packets A 202, B 204, C 206. In this example, the dotted line P1 220 indicates that the packet A 202 passed through routers C 126, B 118 and A 108, in that order. The dotted line P2 222 indicates that the packet B 204 passed through router A 108 alone. The dotted line P3 224 indicates that the packet C 206 passed through routers B 118 and C 126, in that order.

The three sensors A 208, B 210, and C 212, may receive packets A 202, B 204, C 206 transmitted from the routers A 108, B 118, C 126, in turn send the packets A 202, B 204, C 206 to a data collection module 214 where the packets A 202, B 204, C 206 from the sensors A 208, B 210, and C 212 are collected or acquired centrally. The data collection module 214 generates the time stamps A 232, B 234, and C 236 (not shown) for the packets A 202, B 204, C 206 respectively. The time stamps A 232, B 234, and C 236 generated for the packets A 202, B 204, and C 206 at one router will change when the same packets are received at a different router. The data collection module 214 further sends the packets A 202, B 204, C 206 to an analysis module 216 for analysis.

It should be noted that an example of the packet A 202 traveling through the path P1 220 is received at all three routers A 108, B 118 and C 126 and therefore the same copy of the packet is received at the data collection module 214.

The data collection module 214 sends the packets A 202, B 204, and C 206 received to a digest information generator 215 that generates a footprint for the packets A 202, B 204, C 206 received at the respective sensors A 208, B 210, and C 212. The sensors A 208, B 210, and C 212 perform the function of receiving the packets A 202, B 204, C 206 transmitted from the routers A 108, B 118, C 126 for further analysis. The sensors A 208, B 210, and C 212 send the packets A 202, B 204, C 206 traveling through paths P1 220, P2 222, and P3 224 from the routers A 108, B 118, C 126 to the data collection module 214 where packets A 202, B 204, C 206 are received and queued for further analysis.

The analysis module 216 performs an analysis to estimate the paths of the packets P1 220, P2 222, and P3 224. The generation of a footprint is explained in conjunction with FIG. 6. Based on the footprint, an analysis is performed by the analysis module 216 to compute the routing path. The footprint is used to uniquely identify the packets A 202, B 204, C 206 received at the routers A 108, B 118, and C 126. Consider an example of the packet C 206 traveling though path P3 224, the packet C 206 is received first at router B 118, the packet C 206 is then transmitted to sensor B 210, a footprint 246 (not shown) for the packet C 206 is then generated after it is assigned time stamp C 236 (not shown) at data collection module 214 and the packet C 206 along with time stamp C 236 are sent to digest information generator 215. The packet C 206 then travels to router C 126 where it is received and is transmitted to sensor C 212. The packet C 206 is sent to the data collection module and is assigned time stamp C 237 (not shown). A footprint 247 (not shown) is generated for the packet again after being received at router C 126. In the analysis module 216, a comparison of the footprints 246, 247 will reveal that the packets C 206 received at router B 118 and at router C 126 are the same. The path is estimated using the time stamps C 236 and C 237 of the packet C 206 received at two routers B 118 and C 126. In this example of the packet C 206, the time stamp C 236 is earlier than the time stamp C 237. This indicates that the packet C 206 first reached at the router B 118 and subsequently reached at the router C 126. This indicates that the packet C 206 traveled from the router B 118 to the router C 126 and is determined to be the same packet C 206 by comparison of the generated footprints 246, 247. The footprint 247 is then stored after analysis in log 218.

Figure 4:
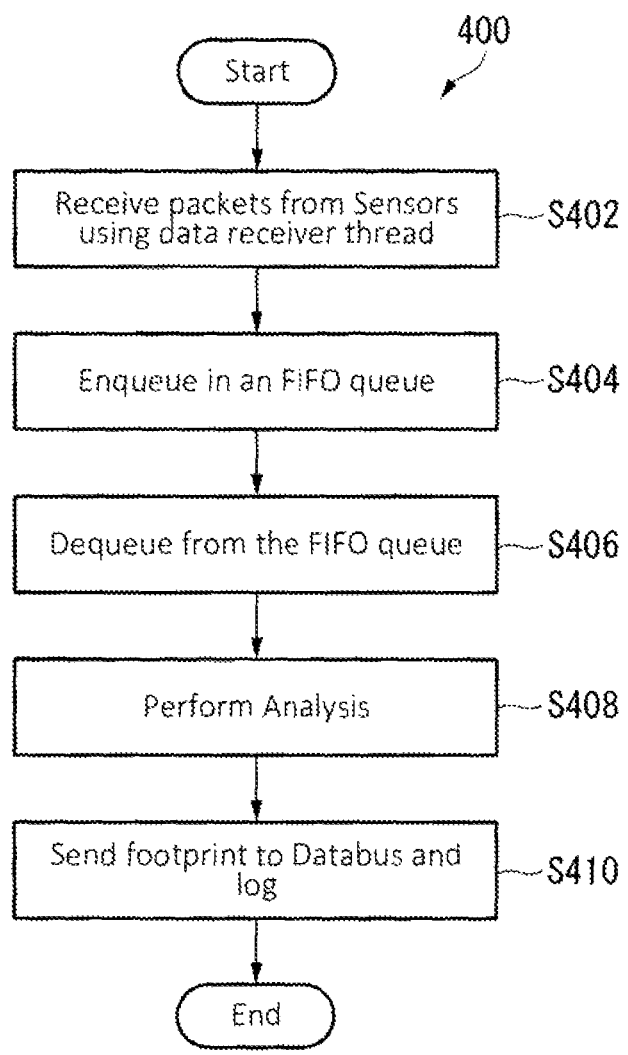
FIG. 4 is a flow chart of an example of a method of estimating routing path according to an embodiment of the present invention.

FIG. 4 is a flow chart 400 of an example method performed according to an embodiment of the present invention to estimate routing path. At step S402, packets A 202, B 204, C 206 from sensors A 208, B 210, and C 212 are received using a data receiver thread 222 present in the data collection module 214. The data receiver thread 222 performs a function of generating a time stamp of a packet received and is used to receive the packet sent from sensors. For example, when packets A 202, B 204, and C 206 are received from the sensors A 208, B 210, and C 212, a time stamps A 232, B 234, and C 236 are generated for the packet to aid further analysis.

Step S404 performs the task of adding the packets A 202, B 204, and C 206 to a First-In, First-Out (FIFO) queue 240 (not shown) present in the data collection module 214. It should be noted that the FIFO queue 240 has a memory spaces 412 (not shown) with each memory space representing a predefined time unit. A small time unit improves an accuracy of estimating the routing path. According to some embodiments of the invention, the predefined time unit used is less than one second. In another preferred embodiment, a millisecond time resolution is required for a greater accuracy in estimating the routing path of the packet.

During this step S404, the queue 240 is made up of memory spaces 412 either with or without a packet. In some embodiments of the present invention, the FIFO queue 240 includes more than one packet for each memory space 412.

At step S406, the contents of the queue 240 are dequeued and are used for performing analysis of the packets A 202, B 204, and C 206 by an analysis module 216. Before the analysis, packets A 202, B 204, C 206 are passed to a digest information generator 215 to generate a footprint for each packet received from the FIFO queue 240 during the dequeue operation. The footprints for each packet A 202, B 204, and C 206 are then used to identify the packet as unique entities. During step S408, the analysis results in the estimation of the routing path for the packet analysed. The time stamps A 232, B 234, and C 236 and generated footprints are primarily used for routing path estimation. It should be noted that these time stamps change when the packets A 202, B 204, and C 206 are received at another router. The steps of the analysis are explained in detail in conjunction with FIG. 8.

At Step S410, the footprints, after analysis, are sent to the databus. The packets A 202, B 204, and C 206 can be received by other clients attached to the data bus by broadcast. Any client attached to the data bus is used for further analysis of packets A 202, B 204, and C 206 after the routing path is estimated. The footprints thus generated at step S406 during analysis are logged and stored in log 218.

Figure 5:
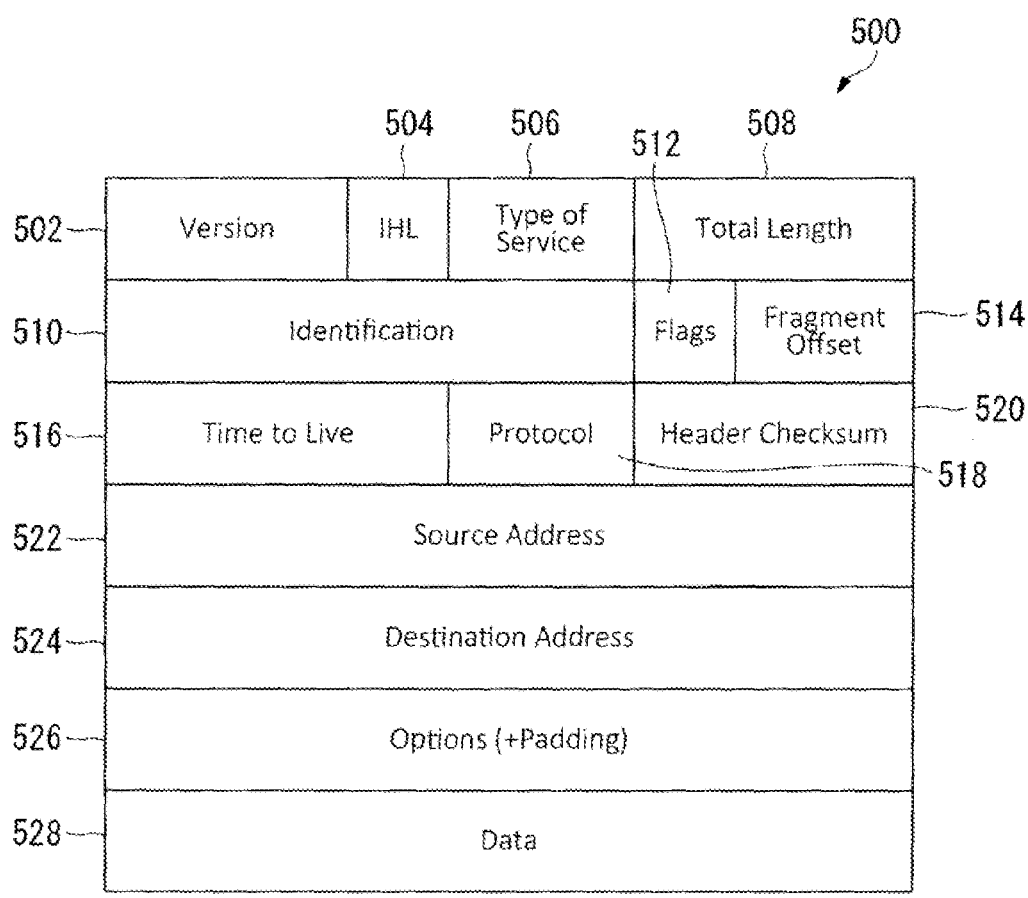
FIG. 5 is a diagram of data structure of an IP packet according to some embodiments of the invention.

FIG. 5 is a diagram of data structure of an IP packet 500 according to some embodiments of the invention. An IP packet consists of a header and a payload sections. The standard for IP is defined in RFC 791. The header section includes information necessary to route the accompanying data to a particular destination. The payload section includes the actual data that is transmitted using the IP packet.

The header includes the following information. Version 502 is the first header field in the IP packet 500. The version 502 is a four bit field. For example, the Internet Protocol version 4 (IPv4) has a value "4". Internet Header Length (IHL) 504 is a four bit field that specifies the length of the header. Type of Service 506 is a field used to carry priority information. Based on the type of service field data, the packet is prioritized in a queue and therefore is to be used for latency, throughput and reliability requirements specification. Total length 508 is a sixteen bit field that allows specification of entire packet (fragment) size, including header and data, in number of bytes. Identification 510 is used to identify the group of fragments of a single IP packet. Flags 512 are a three bit field used to identify or control fragments. Fragment Offset 514 is thirteen bit long and is used to identify the current packet with reference to the beginning of an unfragmented datagram. Time to Live (TTL) 516 helps datagrams from passing around networks indefinitely thereby giving them a specific time period for transmission to a particular destination. For each hop at a router, the TTL is decremented. If the TTL is zero, a router will discard the packet. Protocol 518 is used to define the protocol used in an IP datagram.

Header checksum 520 is used in an IP packet 500 to check errors, this value is used by a router to calculate checksum of the packet header and compare the value with the header checksum field present in the IP packet 500. If the value of checksum calculated by the router is not identical to the header checksum 520 in the IP packet 500, the router discards the IP packet 500 as being erroneous. The IP packet 500 is likely to have been damaged during a transmission or receiving process to the router. Source address 522 is a field that stores the IP address of the packet sender. Destination address 524 is a field that is used to define the destination of the IP packet 500.

In addition to all the above mentioned fields present in the IP header, an options 526 field is present and is used to add additional flexibility to how IP handles datagrams. Data 528 field represents the payload section and is appended to the header.

Figure 6:
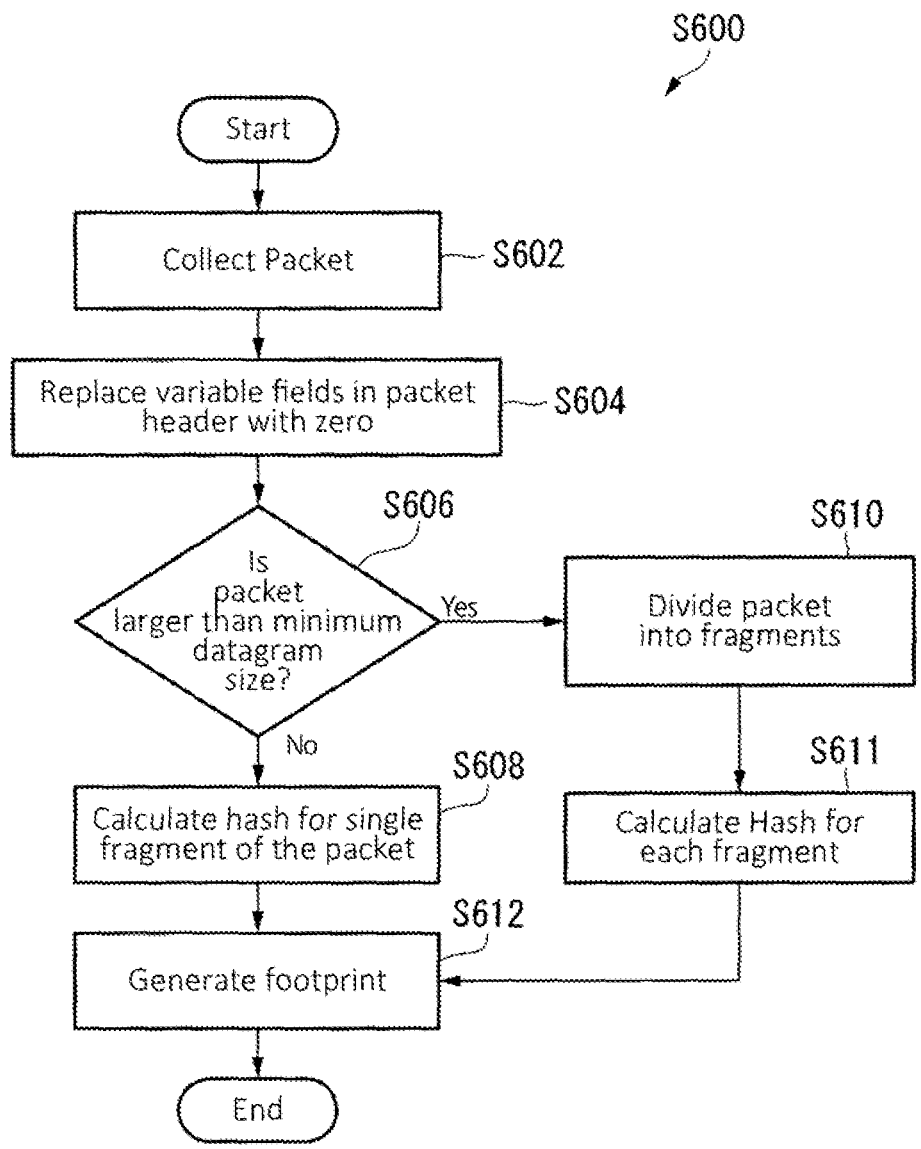
FIG. 6 is a flow chart showing generation of a footprint structure according to some embodiments of the invention.

FIG. 6 is a flow chart showing generation of a footprint structure according to some embodiments of the invention.

According to this embodiment of the present invention, an exemplary packet A 202 passing through routers A 108, B 118 and C 126 is collected, at step S602. The packet is then transmitted to sensors A 208, B 210, and C 212. All the subsequent steps are performed in a digest information generator 215 and the packet A 202 is sent to data collection module 214 before the digest information generator 215.

At step S604, the variable fields in the packet A 202 are replaced with zero. For example, in an IP packet fields such as type of service 506, TTL 516, checksum 520, fragment offset 514 and options 526 are replaced with zero. This operation is performed in order to eliminate variable fields in the packet header during calculation of a hash. A hash is a unique identifier generated using an input data passed through a hash function to result in a hash value or referred to as a hash. In this embodiment of the present invention, an input data to the hash function is the IP packet with variable fields replaced with zero and the result after passing through a hash function is a hash value that can uniquely identify the same IP packet. Some examples of hash functions include, but are not limited to, secure hash algorithms (SHA) and message digest algorithm (MD-5).

The packet A 202 is fragmented due to the restriction on maximum transmission unit (MTU) while passing through networks that lie between routers. MTU is defined as the largest transmission unit that is allowed to pass onwards with respect to a particular communication layer network protocol. In IPv4, the minimum datagram size is 576 bytes as specified in RFC 791 and all host devices must be prepared to accept datagrams of this minimum datagram size. Similarly, in IPv6, the minimum datagram size 1280 bytes. The actual MTU size for packet transmission depends on factors not limited to type of network topology and type of transmission media and is greater than the minimum datagram size specified for the respective IP protocol. An IP packet arriving at a network with its size exceeding the MTU allowed on that network is fragmented by a router. This IP packet may be reassembled when it passes through a different network further along its path.

In a preferred embodiment, the packet is divided into fragments greater than or equal to a minimum datagram size allowed in the entire network path, for further analysis of a packet and calculation of hash. This fragmentation for further analysis and calculation of hash is not performed by a router but by the analysis module 216. For example, the minimum datagram size permissible in an IPv4 network is 576 bytes. Therefore, a packet with size larger than 576 bytes is read as two fragments thereby having a first fragment of size 576 bytes and the second fragment with size equal to difference of packet size and 576. The use of minimum datagram size is of particular advantage to this embodiment of the invention as the system can calculate the path taken by a packet even when the same packets are received in different sizes. A check for the total size of header and data is made to determine whether it exceeds minimum datagram size performed at step S606. Depending on the result of the check at step S606, when the total size of the IP packet exceeds minimum datagram size allowed on the network, the packet A 202 is divided into fragments of the minimum datagram size for analysis. Subsequently, at step S611, a hash for each fragment having the minimum datagram size is calculated. For example, considering the case of IPv4, the hash may be calculated for the first 576 bytes and another hash for the subsequent fragment of the packet and so on. In some embodiments of the present invention, only the first fragment is of the minimum datagram size and the second fragment is of the size equal to the size of packet minus the minimum datagram size. For example, if there are two fragments 716 and 718 (not shown) of the packet A 202, two hashes Hash-1 706 and Hash-2 708 are calculated. The use of the minimum datagram size is of particular advantage to this embodiment of the invention as the system can calculate the path taken by a packet even if the packets are fragmented or reassembled. For this reason, the Hash-1 706 is calculated based on the first 576 bytes of the packet. If the result of the check at S606 is that the packet A 202 is one fragment, then one hash value is calculated, at step S608. If the result check at step S606 shows the packet size is greater than minimum datagram size, then a hash for each fragment is calculated at S608. It should be noted that the number of fragments is calculated by dividing the total of header and data size by the minimum datagram size specified in a transmission protocol. Further, at step S612, a footprint 618 (not shown) is generated. The structure of a footprint 618 is described in conjunction with FIG. 7.

Figure 7:
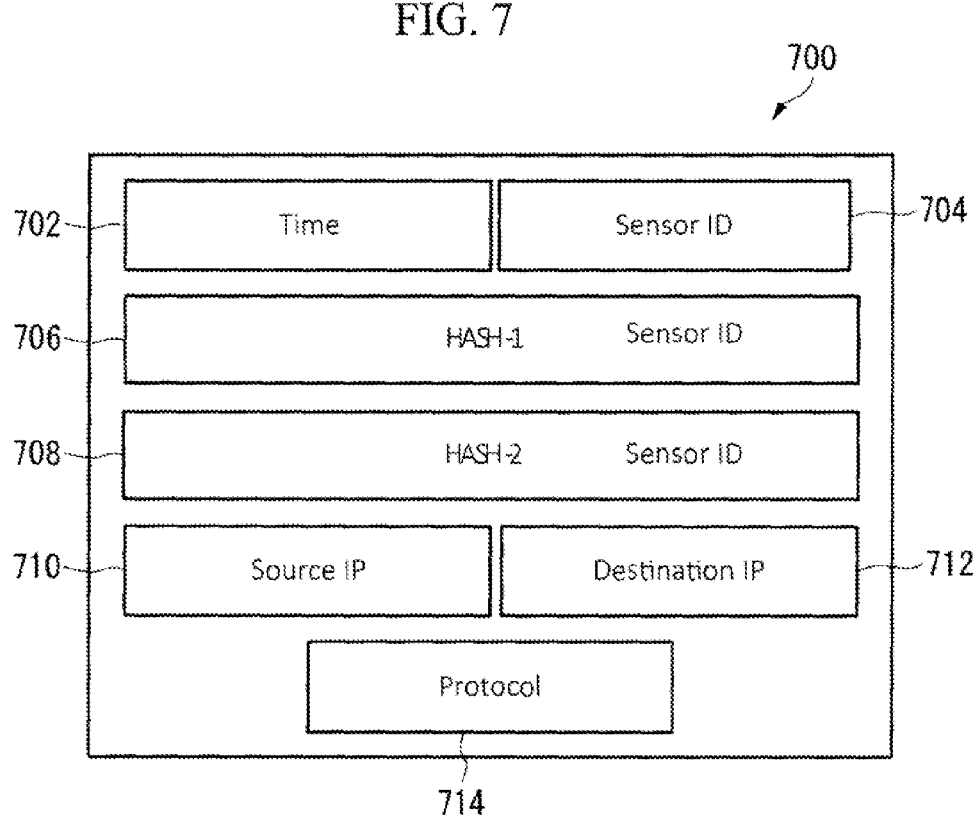
FIG. 7 is a diagram of data structure of footprint according to some embodiments of the invention.

FIG. 7 is a diagram of data structure 700 of footprint 618 according to some embodiments of the invention. The footprint 618 is generated as part of the step S612 shown in the flow chart of FIG. 6. In an embodiment, a footprint is stored as an object in the memory of a computing device performing analysis. The footprint includes the following fields: Time 702 indicative of the time stamp of a packet when it was received at a sensor, Sensor ID (sensor identifier) 704 indicative of the sensor connected to the router at which the packet was received, Hash-1 706 is the value of hash generated, for example, at the step S612 of the flow chart in FIG. 6, Hash-2 708 is generated when there are more than one fragments generated based on MTU size, for example, the hash of fragment exceeding one at step S610, Source IP 710 is the IP address of the source of the packet, for example, this field is the same as source address 522 in the example IP packet shown in FIG. 5, Destination IP 712 is the IP address of the packet's destination, for example, this field is the same as destination address 524 shown in FIG. 5, Protocol 714 represents the protocol that this network transmission adheres to, for example, IP or TCP. The number of fields in the footprint is increased to include more fields derived from packet in order to increase the accuracy of packet comparison and thereby increasing the efficiency of routing path estimation.

Figure 8:
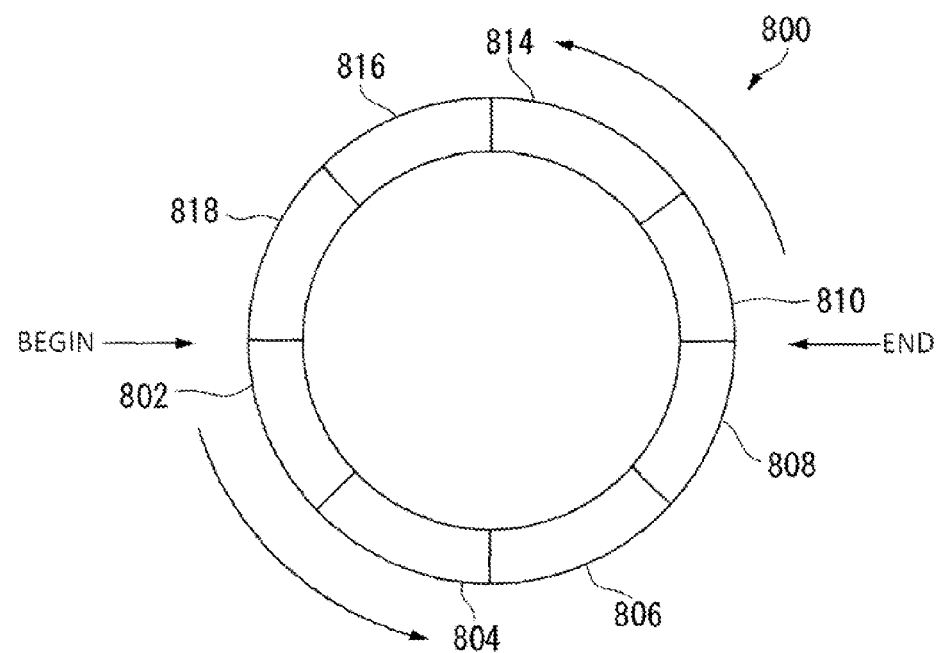
FIG. 8 is a diagram of a circular buffer data structure according to some embodiments of the present invention.

FIG. 8 is a diagram of a circular buffer 800 as a data structure according to some embodiments of the present invention. A circular buffer 800 is a data structure used for a fixed size buffer. The circular buffer 800 as shown in FIG. 8 shows memory slots 802, 804, 806, 808, 810, 814, 816, and 818. In a preferred embodiment of this invention, the circular buffer 800 is used to store packet information such as a footprint. The circular buffer 800 is a particular implementation of memory slots present in an analysis module 216. An example operation, in the embodiment of the present invention includes, storing a footprint in a memory slot 802, another in 804 and so on, until all the memory slots 802, 804, 806, 808, 810, 814, 816, 818 in the circular buffer 800 are filled. In a preferred embodiment, the memory slots 802, 804, 806, 808, 810, 814, 816, 818 are configured to store both a footprint 618 and sensor identifiers.

As a consequence of a circular buffer 800, the analysis module 216 identifies an oldest memory slot, based on the time stamp of the footprints in the memory slots 802, 804, 806, 808, 810, 814, 816, 818. Then the analysis module 216 starts overwriting the oldest memory slot for the addition of new footprint to a memory slot 802, 804, 806, 808, 810, 814, 816, 818 in an already full circular buffer 800, when the all the memory slots 802, 804, 806, 808, 810, 814, 816, 818 are full. The analysis module 216 vacates the oldest memory slot before storing a footprint according to some embodiments of the invention.

The advantage in implementing memory slots in the form of the circular buffer 800 is that the entries in the older memory slots get overridden automatically. The use of the circular buffer in performing routing path analysis is further explained in FIG. 9. It will be understood by a person skilled in art that other data structures that include, but are not limited to, queue, stack, binary trees, or heaps may be used to implement memory slots present in analysis module 216 and therefore the scope of the invention shall not be construed to be limited to circular buffer.

Figure 9:
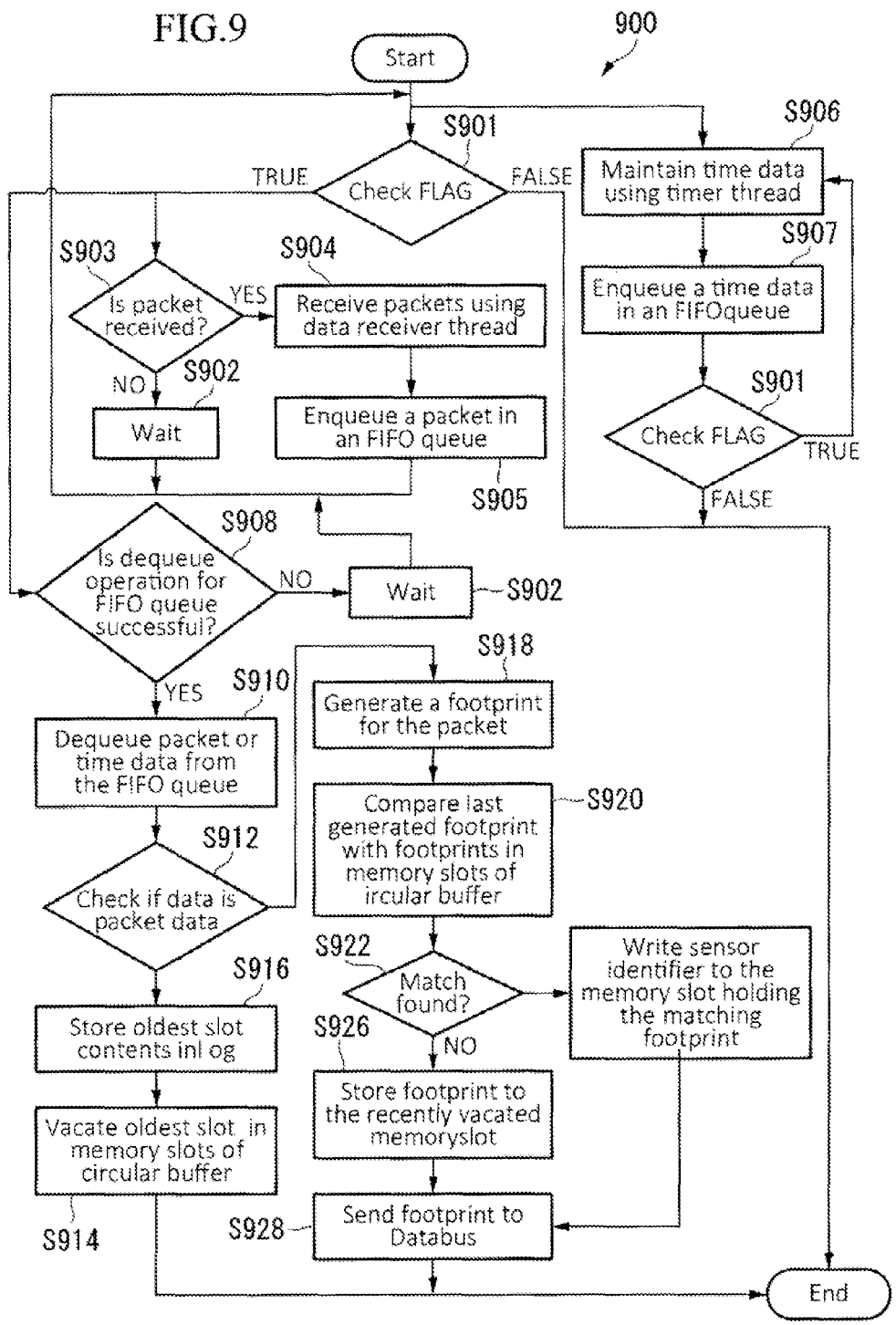
FIG. 9 is a flow chart for routing path estimation, according to some embodiments of the present invention.

FIG. 9 is a flow chart 900 for routing path estimation, according to some embodiments of the present invention.

In accordance with an embodiment of the present invention, a Boolean variable 930 (not shown), that is maintained as either TRUE or FALSE, is maintained in the data collection module 214. In an example, the Boolean variable FLAG 930 is used to change the start or stop operation of the system to receive and analyse routing path of packets.

In this embodiment, during step S901, the status of the FLAG 930 is checked to determine whether it is set to TRUE or FALSE. If FLAG 930 is set to TRUE, at step S903 the data collection module 214 checks whether any packet is received. If the result of the check in step S903 indicates packets are received, the data receiver thread receives the packets A 202, B 204, C 206 at step S904. The data receiver thread adds the packets A 202, B 204, C 206 received at step S904 to an FIFO queue 240 (not shown) at step S905. A data receiver thread 222 in the data collection module 214 is capable of packets received at sensors A 208, B 210, and C 212. The received packets A 202, B 204, C 206 are time stamped by the data collection module 214, at the time they were received by the sensors A 208, B 210, and C 212. Time stamps A 232, B 234, and C 236 are thus generated. The time stamps 232, B 234, and C 236 vary each time the packets A 202, B 204, and C 206 travel to a subsequent router. The data collection module 214 repeats the status check for FLAG 930 at step S901 again. If the result of the check in step S903 indicates that no packet is received, the data collection module 214 waits for a short duration of time during step S902 during step S902, for example 250 milliseconds, before returning to check the FLAG 930 at step S901.

In this embodiment of the invention, a timer thread 220 maintains the time data at step S906. The timer thread 220 keeps tracks units of time essential to determine the routing path of packets. At step S906, the timer thread 220 present in the data collection module adds the memory spaces 412 to the FIFO queue 240 (not shown), during step S907, available to receive data for a predefined number of time units. Subsequently, a check FLAG 930 operation is performed, as explained earlier. At this juncture, the FIFO queue 240 contains either time data or packets for further analysis.

Step S905 performs the task of adding the packets A 202, B 204, and C 206 to an FIFO queue 240 present in the data collection module 214. It should be noted that the FIFO queue 240 has memory spaces 412 representing a predefined time unit.

According to an embodiment of the present invention, at step S908, the data collection module 214 checks whether the dequeue operation is successful. The presence of packets in the FIFO queue 240 will allow for the result of the dequeue operation to be successful. If the result of the check at S908 is successful, the FIFO queue 240 is then dequeued in step S910, this operation results in knowing that for each unit time there is either an empty memory space or at least one of packets A 202, B 204, C 206 in the order they were actually received, for further analysis. The FIFO queue 240, timer thread 220, and data receiver thread 222 are present in the data collection module 214. A small time unit improves an accuracy of estimating the routing path. According to some embodiments of the invention, the predefined time unit is lesser than one second such as millisecond. If the check performed at step S908 is unsuccessful, the data collection module S918 waits for a short duration of time, for example 250 milliseconds, and repeats the check FLAG operation in step S901.

According to another embodiment of the present invention, step S912 is performed by a digest information generator 215 to check whether dequeue operation resulted in either packets or an empty memory space. In case dequeue operation results in a packet; a footprint 618 is generated for an exemplary packet C 206 received. If no packet is received as a result of dequeue operation, then, at step S914, the FIFO queue 240 information is logged in a log file, by the analysis module 216. In an embodiment, a preferred data structure is a circular buffer 800 with memory slots 802, 804, 806, 808, 810, 814, 816, 818.

According to some embodiments of the invention, the analysis module 216, in Step 914 identifies an oldest memory slot, based on the time stamp of the footprints in the memory slots 802, 804, 806, 808, 810, 814, 816, 818, when the circular buffer 800 is full. Then the analysis module 216 vacates the oldest memory slot. The analysis module 216 overwrites the oldest memory slot according to some embodiments of the invention. The content thus vacated at step S914 are moved to a log file for archival purposes.

At step S918, the footprint 618 is generated by the digest information generator 215, when the packet C 206 is received. In this case, the footprint 618 is an identifier used for uniquely identifying the packet C 206 passing through a network. For example, the footprint 618 is a hash generated using a hash function for the IP packet received at a router. The footprint 618 may include other information derived from the packet as well. Generation of a hash after collecting the IP packet C 206 and replacing the variable fields is explained in the description corresponding to FIG. 6. The hash is thus generated and is added along with additional packet information such as time stamp 702, sensor identifier 704, source IP 710 and destination IP 712 to form a footprint about the packet C 206. The structure of the footprint is explained in description corresponding to FIG. 7. The footprint of a given packet includes a subset of data derived from the packet and is therefore smaller in size compared to the original packet. This allows storage and analysis of packets in real time for a limited time frame.

The analysis module 216, after generates footprints in the memory slots of the circular buffer, perform a process at step S918. During step S920, a last generated footprint 618 is compared with the footprints already present in the memory slot of the circular buffer 800. The structure and working of a circular buffer is explained in the description corresponding to FIG. 8. The circular buffer is an appropriate data structure for the analysis module 216 for the reason that it has limited memory size and the nature of circular buffer to automatically free memory slots when the buffer is full. If a match is found during comparison operation in step S920, then, at step S924, the sensor identifier 704 is added to the memory slot containing the footprint 618. This newly stored information will be used to compute the routing path and in anticipation of the packet at a different router. Thus, within the timeframe that is represented by the circular buffer 800, footprints of same packet received at a different router can be identified by using the same footprint 618 with a different sensor identifier 704 linked to a router.

After storing the sensor identifier 704 to the circular buffer 800, if the circular buffer 800 is full, then the footprints and sensor identifiers removed from memory slots to create new memory slots are stored in a log and sent to the databus.

It should be noted that due to the fixed size of the circular buffer 800, the footprints present in the memory slots can only be held for a limited period of time. Because of the limited memory in circular buffer, the footprints are stored in a log at step S916 when the circular buffer is full and are sent to a databus subsequently, at step S928. The circular buffer 800 is also synchronized with the timer thread to vacate the memory slots. If a match is not found during the comparison at step S922, then at step S926, the footprint 618 is written to the newest memory slot in the circular buffer 800, if all existing memory slots are full. The footprint 618 is written to the available memory slot, if the memory slots of the circular buffer 800 are not full. The footprint 618 is then sent to the Databus, at step S928.

Figure 10:
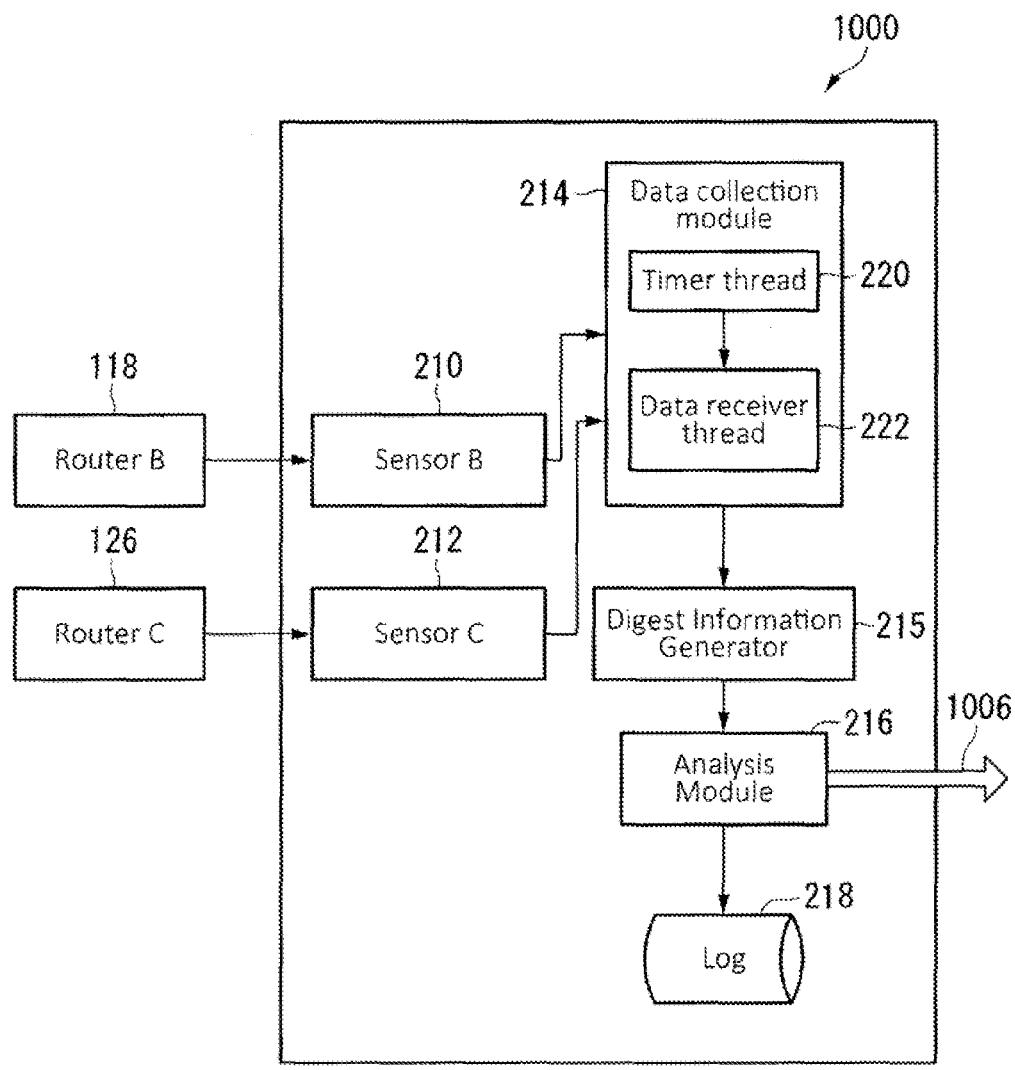
FIG. 10 is a block diagram of a system for determining routing information, according to some embodiments of the present invention.

FIG. 10 is a block diagram of system 1000 for determining routing information, according to some embodiments of the present invention. The system includes router B 118 and router C 126, sensor B 210 and sensor C 212, a data collection module 214, a digest information generator 215, an analysis module 216, a databus 1006 and a log 218. The data collection module 214 in turn includes a timer thread 220 and a data receiver thread 222. For example, consider an IP packet B 204 that flows from router B to router C. The IP packet B 204 has the data structure as shown in FIG. 5. The IP packet B 204 is sent to sensor B 210. The packet B 204 is sent to the data collection module 214. Subsequently, the IP packet B 204 moves to router C 126 at a later point in time and is mirrored at sensor C 212. The same IP packet is received both at routers B 118 and router C 126. The IP packet B 204 is then transmitted to its destination.

In the data collection module 214, FIFO queue 240 is present in the data collection module 214. A timer thread 220 present in the data collection module 214 divides the memory space available to the FIFO queue 240 available to receive data for a number of time units. A preferred time unit is milliseconds. A data receiver thread 222 in the data collection module 214 is capable of receiving packets received at sensors B 210 and C 212. In this example, the packet B 204 is received first at router B 118 and second at router C 126. Therefore, in the FIFO queue 240 present in the data collection module 214, there will be packet B 204 at first, followed by empty memory spaces 412 and there will be another copy of the same packet B 204 received at router C 126. Both the received packets are time stamped by the data receiver thread 222, at the time they were received at the sensors. The contents of the FIFO queue 240 now are received at sensor B 210, a few empty spaces with only time stamps followed by packet received at sensor C 212. The empty memory spaces 412 are indicative of the time taken for the packet B 204 to travel from the router B 118 to router C 126.

The contents of the FIFO queue 240 are read by the digest information generator 215. Because the packet B 204 contains fields that are variable or altered by routers that the packet B 204 passes through, the variable fields are replaced with zero before further processing. The hash calculation is performed only for one fragment based on the minimum datagram size at a time in case the packet size is larger than one MTU; the packet is divided into fragments of each with minimum datagram size and then used further. Footprint of each packet thus received is includes using a hash function to calculate a hash value 1008 (not shown). The result after passing through a hash function is the hash value 1008 that can uniquely identify any IP packet. Some examples of hash function include, but are not limited to, secure hash algorithms (SHA) and message digest algorithm (MD-5). In this example, MD5 hash value of an IP packet B 204 may be a string such as "464668D58274A78". This hash value 1008 is included along with other properties derived from the IP packet header to form a footprint of the IP packet B 204. Thus, the footprint is embedded in the footprint. The structure of footprint is explained in conjunction with FIG. 7. A footprint is generated for the packets received at router B 118 and router C 126.

The analysis module 216 stores each one of footprint which includes footprint generated using a hash function in memory slots. In this example, the structure of the memory slots is in the form of a circular buffer. The footprint generated by the digest information generator is then stored in the circular buffer as described in FIG. 8. The footprint for the packet received at router B 118 is contains "464668D58274A78" along with other packet header information. In the circular buffer, the last received footprint for the packet received at router C 126 is compared with contents of the circular buffer. Because the same packet moved from router B 118 to router C 126, the hash value 1008 present in the footprint generated will be the same i.e., "464668D58274A78". Thus, it is determined that the same packet B 204 passed through the two routers router B 118 and router C 126 and the order is determined using the respective time stamps. The footprint is then stored in the circular buffer because a match for the hash value 1008 is found. In cases where there is no match found in the circular buffer for the hash value 1008, the footprint is passed on to the databus and stored in the log. The hash value 1008 is used for comparison of two packets and information present in the circular buffer. However, the accuracy of comparison may be increased by comparing all the information present in the footprint.

In another embodiment of the present invention, the log 218 is searched for footprints, in order to determine whether a packet had passed through routers router B 118 and router C 126 connected to the system.

Figure 11:
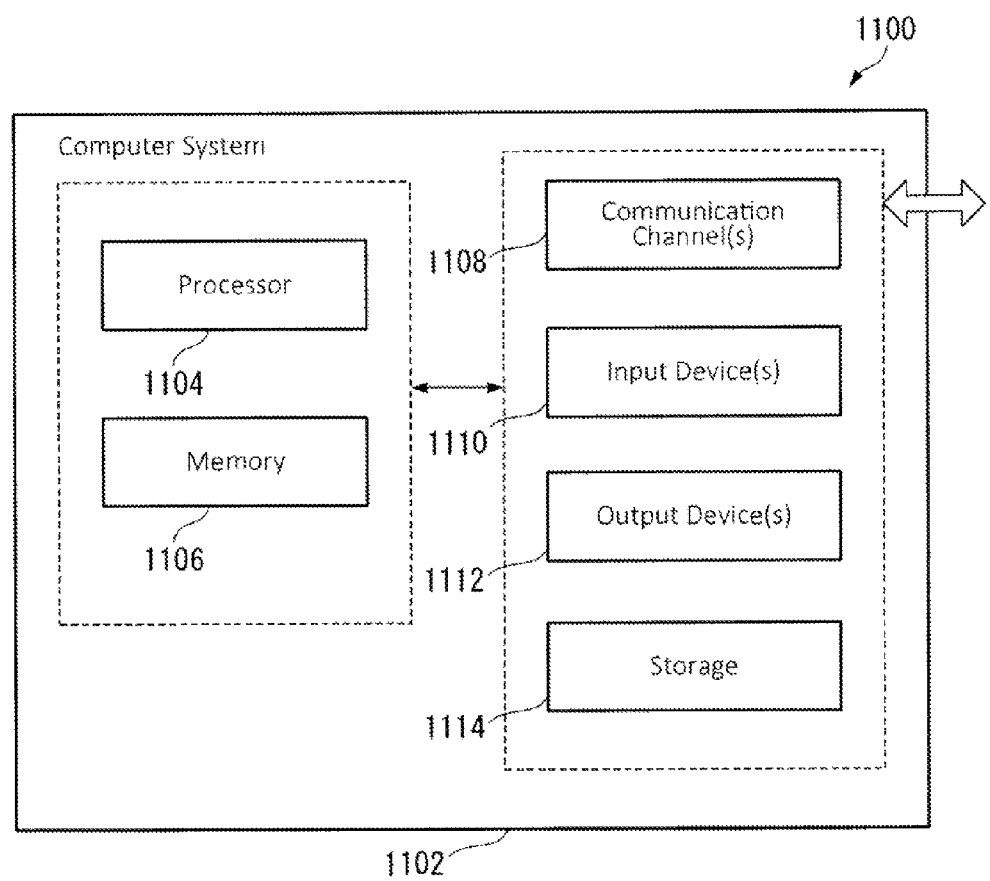
FIG. 11 illustrates an example of the system according to some embodiments of the present invention.

FIG. 11 illustrates an exemplary system 1100 in which some embodiments of the system are implemented.

The system 1102 includes at least one processor 1104 and at-least one memory 1106. The processor 1104 executes program instructions and may be a real processor. The processor 1104 may also be a virtual processor. The computer system 1102 is not intended to suggest any limitation as to scope of use or functionality of described embodiments. For example, the computer system 1102 may include, but not limited to, one or more of a general-purpose computer, a programmed microprocessor, a micro-controller, an integrated circuit, and other devices or arrangements of devices that are capable of implementing the steps that constitute the method of the present invention. In an embodiment of the present invention, the memory 1106 may store software for implementing various embodiments of the present invention. The computer system 1102 may have additional components. For example, the computer system 1102 includes one or more communication channels 1108, one or more input devices 1110, one or more output devices 1112, and storage 1114. An interconnection mechanism (not shown) such as a bus, controller, or network, interconnects the components of the computer system 1102. In various embodiments of the present invention, operating system software (not shown) provides an operating environment for various software executing in the computer system 1102, and manages different functionalities of the components of the computer system 1102.

The communication channel(s) 1108 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, the Bluetooth or other transmission media.

The input device(s) 1110 may include, but not limited to, a touch screen, a keyboard, mouse, pen, joystick, trackball, a voice device, a scanning device, or any another device that is capable of providing input to the computer system 1102. In an embodiment of the present invention, the input device (s) 1110 may be a sound card or similar device that accepts audio input in analogue or digital form. The output device(s) 1112 may include, but not limited to, a user interface on CRT or LCD, printer, speaker, CD/DVD writer, or any other device that provides output from the computer system 1102.

The storage 1114 may include, but not limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1102. In various embodiments of the present invention, the storage 1114 contains program instructions for implementing the described embodiments.

The present invention may be implemented in numerous ways including as a system, a method, or a computer program product such as a computer readable storage medium or a computer network wherein programming instructions are communicated from a remote location.

The disclosure of the present invention may suitably be embodied as a computer program product for use with the computer system 1102. The method described herein is typically implemented as a computer program product, including a set of program instructions which is executed by the computer system 1102 or any other similar device. The set of program instructions may be a series of computer readable codes stored on a tangible medium, such as a computer readable storage medium (storage 1104), for example, diskette, CD-ROM, ROM, flash drives or hard disk, or transmittable to the computer system 1102, via a modem or other interface device, over either a tangible medium, including but not limited to optical or analogue communications channel(s) 1108. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A packet transmission system comprising:
   one or more processors;
   the processor configured to acquire packets received by a first sensor and a second sensor and generate time stamps for each packet;
   the processor configured to generate a first footprint for the packet acquired by the processor from the first sensor and a second footprint for the packet acquired by the processor from the second sensor; and
   the processor configured to determine whether the second footprint matches the first footprint,
   wherein the first footprint and the second footprint comprise the time stamps for the packet acquired by the processor from the first sensor and for the packet acquired by the processor from the second sensor, respectively,
   wherein the processor is configured to generate the first footprint and the second footprint, each of which comprises at least one hash value calculated based on a hash function and on a transmission unit size specified by a transmission protocol,
   wherein the processor is configured to determine a routing path of the packets, based on the time stamps and hash values of the packets when the processor determines that the second footprint matches the first footprint, and
   wherein the processor is configured to:
   send the second footprint to databus when the processor determines that the second footprint does not match the first footprint; and
   send the second footprint to at least one memory slot when the processor determines that the second footprint matches the first footprint.

2. The system in claim 1, further comprising: a circular buffer having a plurality of memory slots, wherein the processor is configured to store the first footprint and the second footprint in the circular buffer having the plurality of memory slots.

3. The system in claim 1, wherein the processor is configured to further calculate a second hash value for the first footprint and the second footprint when the processor determines that size of the packet exceeds the maximum transmission unit size.

4. A method for estimating a routing path of a packet in a communication network, the method comprising:
   acquiring, by a processor, packets received by a first sensor and a second sensor;
   generating, by the processor, time stamps for each packet;
   generating, by the processor, a first footprint for the packet acquired by the processor from the first sensor and a second footprint for the packet acquired by the processor from the second sensor; and
   determining, by the processor, whether the second footprint matches the first footprint;
   sending the second footprint to databus when the second footprint does not match the first footprint; and
   sending the second footprint to at least one memory slot when the second footprint matches the first footprint,
   wherein the first footprint and the second footprint comprise the time stamps for the packet acquired by the processor from the first sensor and for the packet acquired by the processor from the second sensor, respectively,
   wherein the processor is configured to generate the first footprint and the second footprint, each of which comprises at least one hash value calculated based on a hash function and on a transmission unit size specified by a transmission protocol, and
   wherein the processor is configured to determine a routing path of the packets, based on the time stamps and hash values of the packets when the processor determines that the second footprint matches the first footprint.

5. The method in claim 4, further comprising: storing the first footprint and the second footprint in a circular buffer having a plurality of memory slots.

6. The method in claim 4, further comprising: calculating a second hash value for the first footprint and the second footprint when size of the packet exceeds the maximum transmission unit size.

7. A non-transitory computer readable medium that stores a computer program to be executed by a computer to perform a method for estimating a routing path of a packet in a communication network, the method comprising:
   acquiring, by a processor, packets received by a first sensor and a second sensor;
   generating, by the processor, time stamps for each packet;
   generating, by the processor, a first footprint for the packet acquired by the processor from the first sensor and a second footprint for the packet acquired by the processor from the second sensor; and
   determining, by the processor, whether the second footprint matches the first footprint;
   sending the second footprint to databus when the second footprint does not match the first footprint; and
   sending the second footprint to at least one memory slot when the second footprint matches the first footprint,
   wherein the first footprint and the second footprint comprise the time stamps for the packet acquired by the processor from the first sensor and for the packet acquired by the processor from the second sensor, respectively,
   wherein the processor is configured to generate the first footprint and the second footprint, each of which comprises at least one hash value calculated based on a hash function and on a transmission unit size specified by a transmission protocol, and
   wherein the processor is configured to determine a routing path of the packets, based on the time stamps and hash values of the packets when the processor determines that the second footprint matches the first footprint.

* * * * *